(12) United States Patent
Hori

(10) Patent No.: US 6,286,971 B1
(45) Date of Patent: Sep. 11, 2001

(54) BACK-LIGHT UNIT FOR LIQUID CRYSTAL DISPLAY

(75) Inventor: Masaharu Hori, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/456,258

(22) Filed: Dec. 7, 1999

(30) Foreign Application Priority Data

Dec. 8, 1998 (JP) .................................................. 10-348798

(51) Int. Cl.[7] .......................................................... F21V 7/04
(52) U.S. Cl. ............................................... 362/31; 362/260
(58) Field of Search .................................. 313/493, 216; 362/26, 31, 260

(56) References Cited

U.S. PATENT DOCUMENTS

| | | | |
|---|---|---|---|
| 4,811,507 | * | 3/1989 | Blanchet ................................... 40/546 |
| 4,860,171 | * | 8/1989 | Kojima ...................................... 362/31 |
| 4,914,553 | * | 4/1990 | Hamada et al. ......................... 362/32 |
| 5,178,447 | * | 1/1993 | Murase et al. .......................... 362/31 |
| 5,982,090 | * | 11/1999 | Kalmanash ............................. 313/493 |
| 6,064,455 | * | 5/2000 | Kim ........................................ 349/113 |

FOREIGN PATENT DOCUMENTS

| | | |
|---|---|---|
| 52-167872 | 6/1977 | (JP) . |
| 6313884 | 11/1994 | (JP) . |
| 8160425 | 6/1996 | (JP) . |
| 8-234676 | 9/1996 | (JP) . |

* cited by examiner

Primary Examiner—Sandra O'Shea
Assistant Examiner—Maria Fernandez

(57) ABSTRACT

A back-light unit for a liquid crystal display is provided with a fluorescent lamp having a pole lamp body, electrodes inserted from a side near both ends of the pole lamp body for emitting thermoelectrons, and lead connectors fitted to said pole lamp body. The fluorescent lamp is stored in a lamp storing part formed at a side of a light-introducing plate having a display area on a plate surface. With this arrangement, it is possible to provide a back-light unit capable of equalizing the whole display area without changing a liquid crystal display frame.

8 Claims, 4 Drawing Sheets

BACK-LIGHT UNIT FOR LIQUID CRYSTAL DISPLAY

BACKGROUND OF THE INVENTION

1. Field of the Invention

The present invention relates to a back-light unit for a liquid crystal display wherein the back-light for a light-introducing plate is equalized in a display area of the liquid crystal display.

2. Description of the Related Art

Recently, concerning a liquid crystal display, particularly, used for a notebook personal computer, a display area becomes large and a frame becomes narrow, therefore, various techniques are used in order to match a size of a light-introducing plate with that of a luminous part of a lamp.

For example, FIGS.3 and 4 show a conventional liquid crystal display. In this liquid crystal display, a fluorescent lamp 2 is positioned along a side of a light-introducing plate 1. In this case, when the fluorescent lamp 2 is stored in a liquid crystal display frame 5, the upper and lower sides of the display area 4 tend to be dark. Since both sides of the fluorescent lamp 2 are covered with silicon rubber (lamp-holders/electrode-insulators) 3 for holding and insulating the electrode and the lead connector of the thermionic emission part, the both sides become non-luminous parts.

In order to equalize the back-light in the display area (in order to make the whole display part equally bright), as shown in FIG. 5, a fluorescent lamp 2A is made longer, and thereby parts to be covered with the silicon rubber 3 are positioned at the outsides of the light-introducing plate 1.

However, the parts covered with the silicon rubbers 3 project from the liquid crystal display frame 5. As a result, it is impossible to make the frame narrow.

In order to make the frame narrow, as shown in FIG. 6, both sides of a fluorescent lamp 2B are bent, the electrodes and the lead connectors of the thermionic emission part, namely, the parts covered with the silicon rubber 3 are positioned along the upper and lower sides of the light-introducing plate 1 (for example, see Japanese Patent Application Laid-Open No. Hei8-160425).

However, it is impossible to make the frame narrow sufficiently.

Also, the structure is proposed wherein a substrate on which inverter lighting parts or the like are mounted by the fluorescent lamp is positioned along the side of the light-introducing plate (for example, see, Japanese Patent Application Laid-Open No. Hei6-313884).

However, in order to match the luminous part of the fluorescent lamp with the display area, it is necessary to use a pole lamp of which both sides are bent, therefore, the liquid crystal display frame must be widened to the lamp side so as to match the necks of the pole lamp of which both ends are bent.

SUMMARY OF THE INVENTION

In view of the above, it is an object of the present invention to provide a back-light unit for a liquid crystal display which can equalize and uniformly spread a back-light for a whole of a display area without changing a size of a frame of a liquid crystal display device.

According to an aspect of the present invention, there is provided a back-light unit for a liquid crystal display for equalizing and uniformly spreading back-light for a whole display area comprising:

a fluorescent lamp for emitting thermoelectrons composed of a pole lamp body, electrodes each being inserted from one face near each of both ends of the pole lamp body and lead connectors facing outside the lamp body and outside the back-light unit to apply electric power to the electrodes;

a light-introducing plate to introduce light emitted from said fluorescent lamp to the display area; and a lamp storing part positioned at a side edge of the light-introducing part having the display area on its surface to house the fluorescent lamp.

In the foregoing, a preferable mode is one that wherein further comprises reflector sheets mounted around the light-introducing plate and a lamp holder.

Also, a preferable mode is one wherein the lamp storing part is a long concave part having light-shielding walls at both ends within which the pole lamp body is positioned.

Also, a preferable mode is one wherein the lamp is a pole-like fluorescent lamp being filled with a small amount of mercury vapor and argon gas.

Also, a preferable mode is one wherein the reflector sheets reflect light emitted from the fluorescent lamp and introduce said light to the light-introducing plate.

Also, a preferable mode is one wherein the silicon rubber is used as insulation-holding means for insulating the electrodes and for holding the lead connectors.

Also, a preferable mode is one wherein the concave part is positioned at the left side of the light-introducing plate.

Also, a preferable mode is one wherein the concave part is positioned at the right side of the light-introducing plate.

Also, a preferable mode is one wherein the concave part is positioned at the upper side of the light-introducing plate.

Furthermore, a preferable mode is one wherein the concave part is positioned at the lower side of said light-introducing plate.

With the above configuration, a lamp of which its ends also emit lights is stored in the lamp storing part provided in the light-introducing part, therefore, it is possible to equalize the light for the display area without changing the liquid crystal display frame.

BRIEF DESCRIPTION OF THE DRAWINGS

The above and other objects, advantages and features of the present invention will be more apparent from the following description when taken in conjunction with the accompanying drawings in which.

DESCRIPTION OF THE PREFERRED EMBODIMENTS

In what follows, there will be described a preferred embodiment of the present invention with reference to the accompanying drawings.

Figure 1:
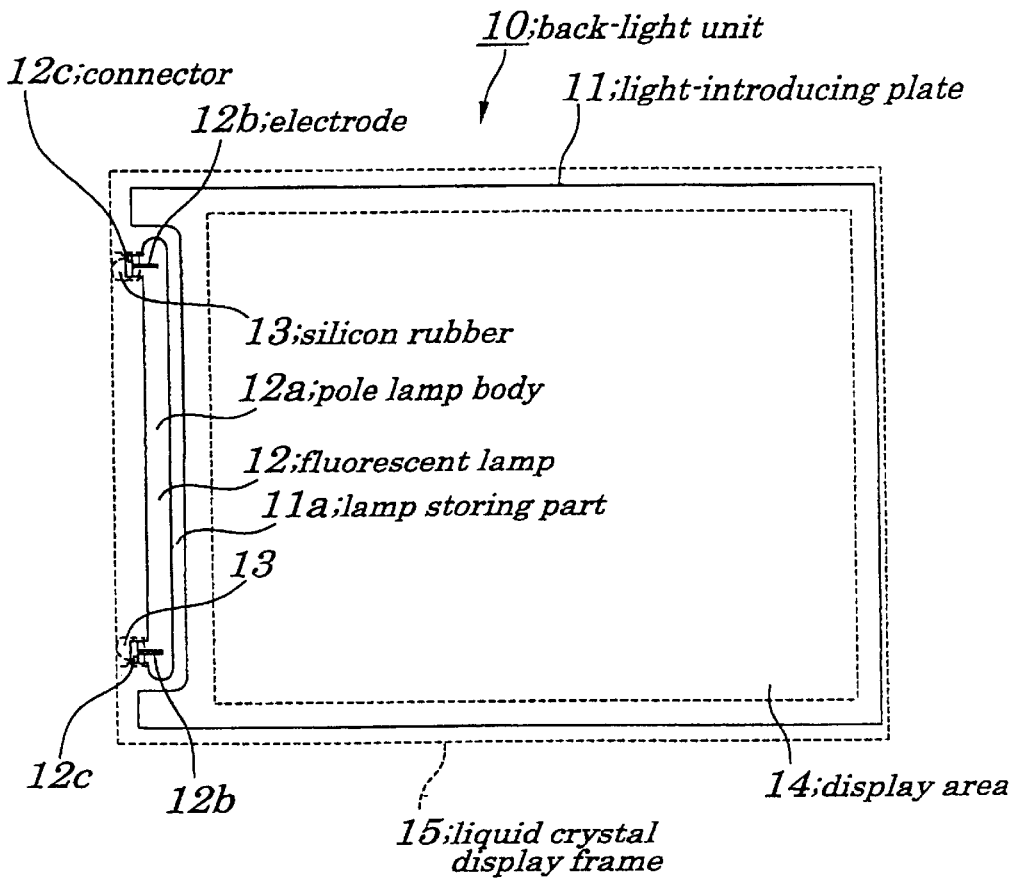
FIG. 1 is a front view showing a back-light unit according to an embodiment of the present invention.
Figure 2:
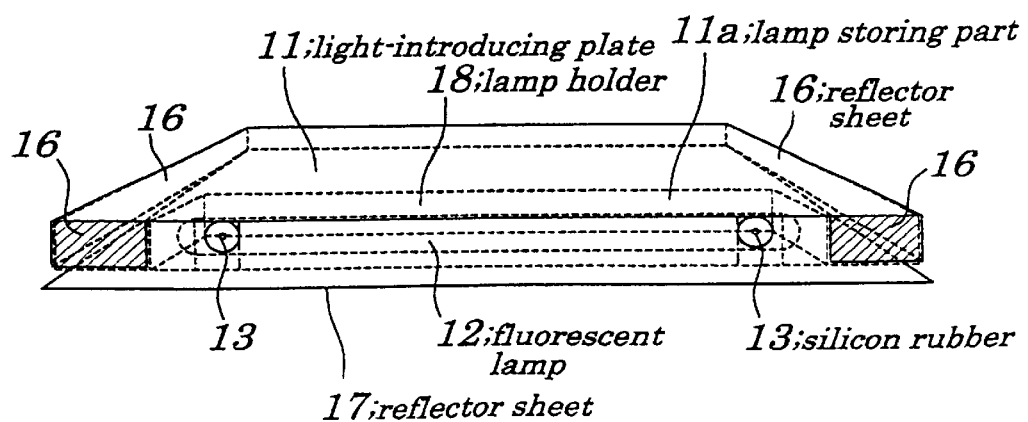
FIG. 2 is a perspective end view showing the back-light unit according to the embodiment of the present invention.
Figure 3:
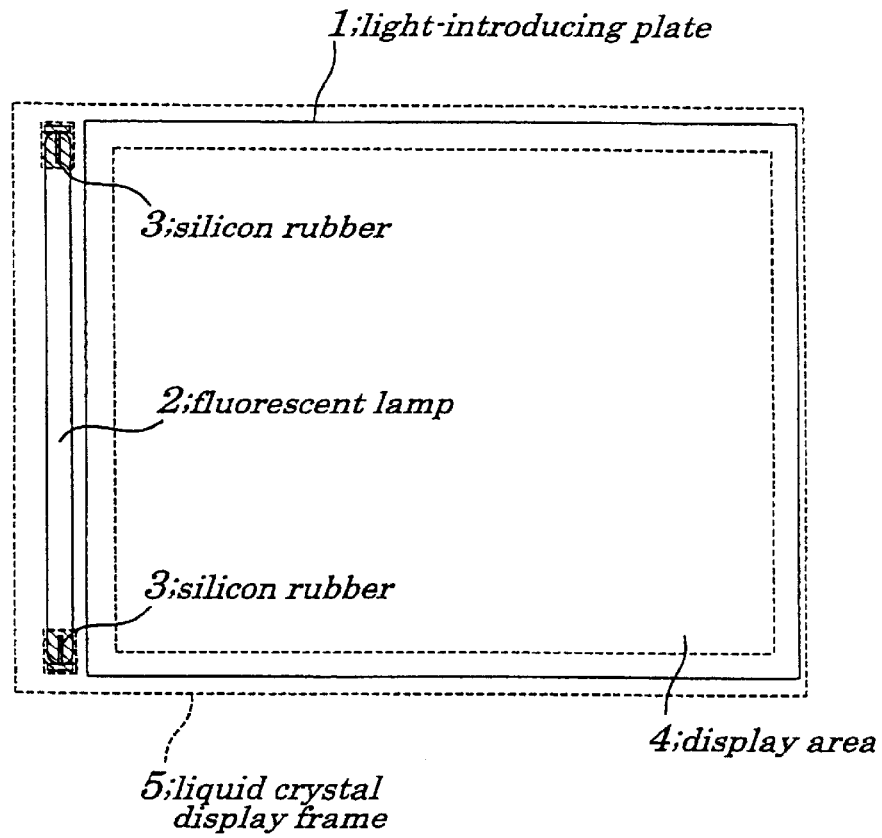
FIG. 3 is a front view showing a conventional back-light unit.
Figure 4:
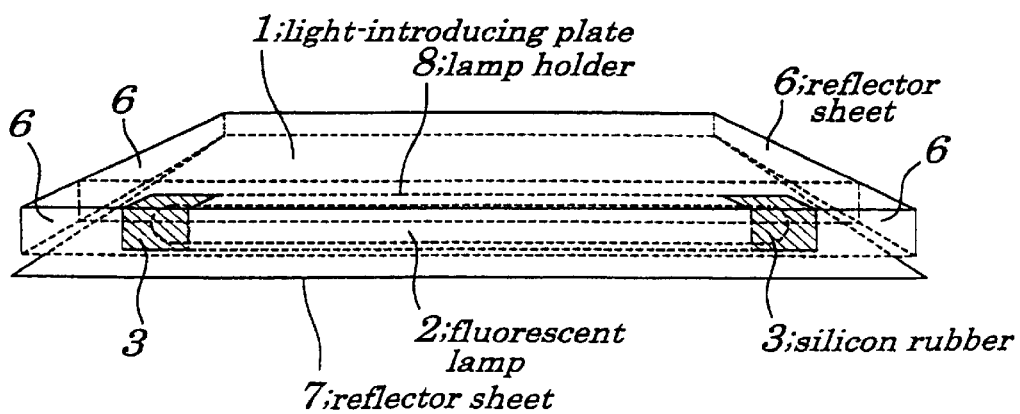
FIG. 4 is a perspective end view showing the conventional back-light unit.
Figure 5:
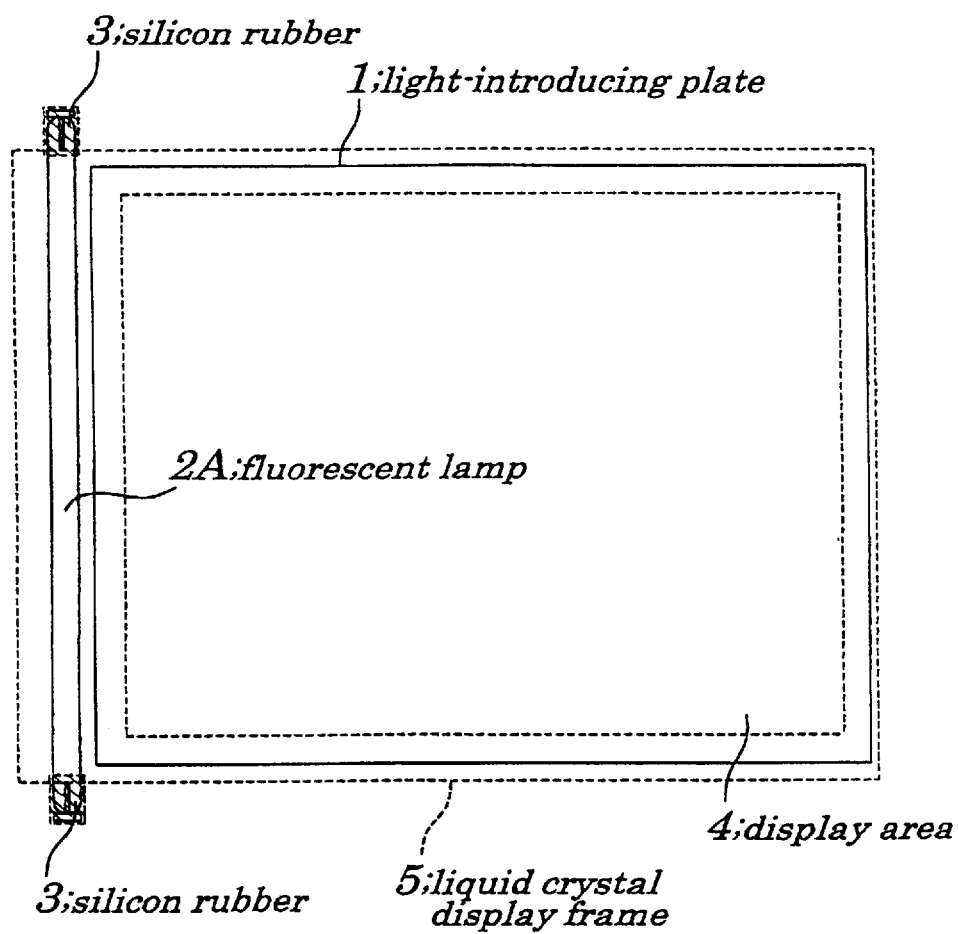
FIG. 5 is a front view showing another conventional back-light unit.
Figure 6:
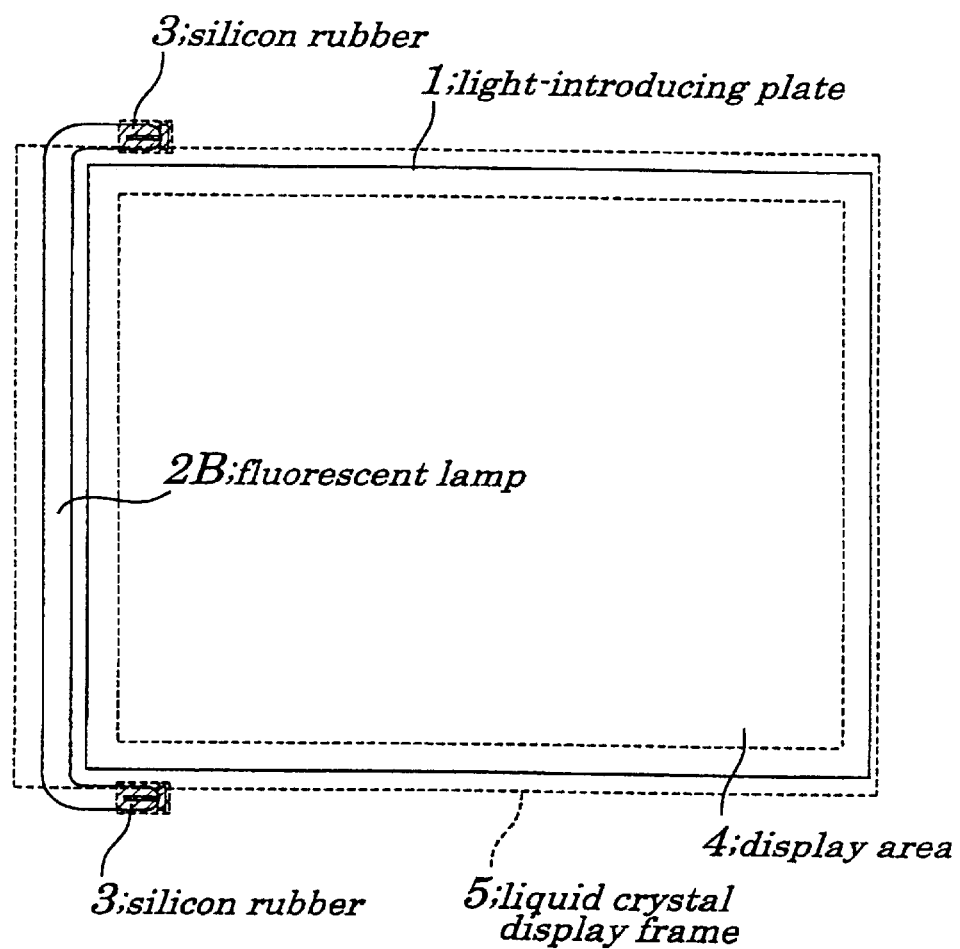
FIG. 6 is a front view showing further another conventional back-light unit.

FIG. 1 is a front view showing a back-light unit according to an embodiment of the present invention, and FIG. 2 is a perspective end view thereof.

A back-light unit 10 for a liquid crystal display (hereinafter, simply ref erred to a back-light unit) is arranged at the rear of a liquid crystal panel so as to improve the visibility in the liquid crystal display.

The back-light unit 10 is provided with a light-introducing plate 11, a fluorescent lamp 12, silicon rubber (lamp-holders/electrode-insulators) 13, a display area 14, a liquid crystal display frame 15, reflector sheets 16, 17 and a lamp holder 18.

The light-introducing plate 11 is a plate for introducing the light emitted from the fluorescent lamp 12 to the display area 14. One side of the light-introducing plate 11 is formed to be concave, namely, is U-shaped, and thereby a lamp storing part 11a is formed. The lamp storing part 11a is a long concave part so as to store and mount the fluorescent lamp 12. Both internal ends of the lamp storing part 11a are shield walls with the reflector sheets 16, 16, and thereby the light emitted from the fluorescent lamp 12 is not emitted from the frame 15.

The fluorescent lamp 12 is provided with pole lamp body 12a, electrodes 12b, 12b for emitting thermoelectorons, and lead connectors 12c, 12c.

The pole lamp body 12a is a glass tube or the like, and is filled with a small amount of mercury vapor and argon gas for discharging light. The electrodes 12b, 12b are inserted into the pole lamp body 12a from one face near both ends so as to expose in the pole lamp body 12a. The lead connectors 12c, 12c are fitted to the electrodes 12b, 12b so as to apply electric power to the electrodes 12b, 12b.

The fluorescent lamp 12 is stored in the lamp storing part 11a in a manner that the lead connectors 12c, 12c face to the opposite side of the light-introducing plate 11.

Bases of the electrodes 12b, 12b and the lead connectors 12c, 12c project from the plate 11, for example, 5 to 6 mm.

The rubber 13, 13 cover the bases of the electrodes 12b, 12b and the lead connectors 12c, 12c. The rubber 13, 13 hold the lamp 12 and insulate the electrodes 12b, 12b, forming non-luminous parts.

The display area 14 makes the light emitted from the fluorescent lamp 12 even, and then makes the light eject in area.

The liquid crystal display frame 15 is stored with the back-light unit 10, a liquid crystal display panel (not shown), or the like, forming a liquid crystal display (not shown).

The reflector sheets 16, 16 are covered on the lamp storing parts 11a, 11a, and thereby the light emitted from the fluorescent lamp 12 is reflected so as to be introduced to the light-introducing plate 11 effectively.

The reflector sheet 17 reflects the light introduced from the fluorescent lamp 12. The reflected light is ejected from the display area 14, and is penetrated through a liquid crystal layer (not shown) of the liquid crystal panel.

The lamp holder 18 holds the fluorescent lamp 12.

Next, an explanation will be given of the operation in this back-light unit 10.

When a main switch (not shown) is turned ON, a voltage is applied between the electrodes 12b, 12b, and thereby discharge starts. The fluorescent lamp 12 emits light, and the light is reflected by the reflector sheets 16, 16 and introduced into the light-introducing plate 11.

The light introduced into the light-introducing plate 11 is reflected by the reflector sheet 17, and then is ejected from the display area 14. The light ejected from the display area 14 penetrates through the liquid crystal layer of the liquid crystal display panel.

An operator views the light penetrating through the liquid crystal layer via a polarizing plate (not shown), a color filter (not shown) or the like.

According to this embodiment, the fluorescent lamp 12 is formed in a manner that the electrodes 12b, 12b and the lead connectors 12c, 12c are positioned on one face near both ends of the pole lamp body 12a, therefore, it is unnecessary to make the frame 15 large, since projections are smaller than those of the conventional one in which both ends of the lamp are bent.

In this embodiment, the concave part (lamp storing part) 11a is formed at the left side of the light-introducing plate 11 in FIG. 1, however, may be formed at the right, lower and/or upper side. Also, fluorescent lamps may be positioned at the right, left, upper and/or lower side of the light-introducing plate 11.

According to the back-light unit 10 of the present invention, as described above, a fluorescent lamp 12, both ends of which also emit light, is positioned in the lamp storing part 11a provided in the light-introducing plate 11, therefore, it is possible to equalize the back-light for the display area 14 without changing the liquid crystal display frame 15. Also, the concave part may be positioned at the upper side or positioned at the lower side of said light-introducing plate.

It is thus apparent that the present invention is not limited to the above embodiments but may be changed and modified without departing from the scope and spirit of the invention.

Finally, the present application claims the priority based on Japanese Patent Application No. Hei10-348798 filed on Dec. 8, 1998, which is herein incorporated by reference.

What is claimed is:

1. A back-light unit for a liquid crystal display for spreading back-light for a whole display area comprising:

a fluorescent lamp for emitting electrons composed of a pole lamp body, a plurality of electrodes each being inserted from one face near each of both ends of said pole lamp body and lead connectors facing outside said lamp body and outside said back-light unit to apply electric power to said electrodes;

a light-introducing plate to introduce light emitted from said fluorescent lamp to said display area; and a lamp storing part having light-shielding walls at both ends positioned at a side edge of said light-introducing part having said display area on its surface to house said fluorescent lamp.

2. The back-light unit according to claim 1, further comprising:

reflector sheets mounted around said light-introducing plate; and a lamp holder.

3. The back-light unit according to claim 1, wherein said lamp storing part is a long concave part within which said pole lamp body is positioned.

4. The back-light unit according to claim 1, wherein said lamp is a pole-like fluorescent lamp being filled with a small amount of mercury vapor and argon gas.

5. The back-light unit according to claim 2, wherein said reflector sheets reflect light emitted from said fluorescent lamp and introduce said light to said light-introducing plate.

6. The back-light unit according to claim 2, wherein said lamp holder comprises silicon rubber which is used as insulation-holding means for insulating said electrodes and for holding said lead connectors.

7. The back-light unit according to claim 1, wherein said light-shielding walls have reflector sheets for reflecting light emitted from said fluorescent lamp.

8. The back-light unit according to claim 1, wherein said lamp storing part is formed as a long concave side of said light-introducing plate.

* * * * *